United States Patent
Hollweck et al.

[11] 3,845,661
[45] Nov. 5, 1974

[54] DEVICE FOR SECURING A TEMPERATURE SENSOR TO A VESSEL WALL

[75] Inventors: Walter Hollweck; Wilhelm Schnee; Karlheinz Eberl; Kurt Wagner, all of Nurnberg, Germany

[73] Assignee: Inter Control Herman Kohler Elektrik GmbH & Co. KG, Nurnberg, Germany

[22] Filed: July 20, 1973

[21] Appl. No.: 381,249

[30] Foreign Application Priority Data
July 20, 1972 Germany............................ 2235676

[52] U.S. Cl.................... 73/343 R, 73/349, 138/90
[51] Int. Cl............................................... G01k 1/14
[58] Field of Search........ 73/343 R, 343 B, 349, 86, 73/421 B, 423; 138/90

[56] References Cited
UNITED STATES PATENTS
2,025,015  12/1935  Byrns................................ 73/349 X
3,246,521  4/1966  Humphrey..................... 73/343 R X
3,581,568  6/1971  Pfefer............................. 73/343 R FOREIGN PATENTS OR APPLICATIONS
312,032  5/1919  Germany............................ 73/349

Primary Examiner—James J. Gill
Assistant Examiner—Frederick Shoon
Attorney, Agent, or Firm—Spencer & Kaye

[57] ABSTRACT

A temperature sensor is positioned in an opening of a vessel wall by a holding mechanism which contains a sealing means that cooperates with the temperature sensor to close off the opening in a fluid tight manner. To that end of the temperature sensor which is inside the vessel, there is releasably attached a plug member which is drawn by the temperature sensor into engagement with the sealing means as the temperature sensor is withdrawn therefrom. Thereafter, the temperature sensor is disconnected from the plug member and the latter is left in engagement with the sealing means while the temperature sensor is removed from the vessel, for example, for replacement.

19 Claims, 4 Drawing Figures

DEVICE FOR SECURING A TEMPERATURE SENSOR TO A VESSEL WALL

BACKGROUND OF THE INVENTION

This invention relates to the field of temperature sensing systems of the type that includes an elongated temperature sensor projecting through the wall of a vessel which contains a fluid medium. The latter surrounds and directly contacts the temperature sensor. Such systems find use in particular in the detection of temperature changes of a liquid heating medium enclosed in the vessel. In such an environment the temperature sensor may be coupled to known devices to energize or de-energize a heater upon reaching a predetermined minimum or maximum temperature and/or plot graphically the temperature changes of the heating medium. Such systems for determining the temperature of the liquid heating medium in a vessel by means of a temperature sensor projecting thereinto through the vessel wall find extensive application in heating liquid-containing boilers for industry and household.

There are generally two known solutions to arrange the temperature sensor in the vessel wall. According to one solution, the temperature sensor, which is surrounded by the heating medium, is directly contacted by the latter. Stated differently, the temperature sensor is not enclosed in any protective sleeve that would separate the temperature sensor from the liquid medium. Such a direct contacting is desirable in order to ensure a rapid heat transmission from the heating medium to the temperature sensor. This arrangement has the disadvantage that the removal of the temperature sensor (for example, for the purpose of repair or exchange) is possible only if the heating medium is depressurized and/or is drained to ensure that when the temperature sensor is removed from the opening in the vessel wall, the heating medium will not escape through the thus uncovered opening. This required procedure is very inconvenient, because the depressurization and drainage of the heating medium is a time consuming operation and, if the heating medium is other than water, it also involves considerable expenses. If, on the other hand, the heating medium is water, then a frequent change thereof leads to a greater calcite deposition in the heating system which is undesirable for reasons of heat technology and durability. Further, the necessity to drain the heating medium leads to the consequence that the heating apparatus, after renewed filling with the heating medium, has to be subjected to multiple steps of deaeration for the purpose of ensuring a fault-free heating operation. A multiple careful deaeration is of particular significance in case of automatically controlled heating apparatus.

The above-outlined disadvantages of the arrangement wherein direct contact between the heating medium and a temperature sensor occurs, have been proposed to be avoided by a second known solution, according to which there is provided a protecting sleeve that projects into the vessel and which is made of a material having good heat conducting properties. The heating medium in the vessel directly contacts the external face of the sleeve, in which the temperature sensor is disposed. By arranging the temperature sensor in this outwardly sealed protecting sleeve, it has been achieved that the temperature sensor could be removed for repair, replacement or exchange without the necessity of depressurizing and/or draining the heating medium. It is, however, a significant disadvantage of this arrangement that the speed of the heat transmission between the heating medium and the temperature sensor is very substantially slowed down by the air present inside the protecting sleeve. This is so, because in practice between the temperature sensor and the protecting sleeve there exists only a point-contact and thus the heat transmission between the sleeve and the temperature sensor is effected substantially through the air contained in the sleeve. Such a slowdown of the heat transmission has the inconvenient and sometimes dangerous consequence that, because of the delayed temperature-dependent response of a switching arrangement, provided, for example, for de-energizing the heating apparatus when the heating medium reaches a given maximum limit value, the heating medium may already have reached a much higher temperature by the time the temperature sensor in fact transmits this limit value to the switching arrangement. The inertia of this second solution may thus cause a substantial overheating of the medium. It is noted that the smaller the volume of the heating medium (the temperature of which serves as a resulting parameter), the greater the danger of a very significant overheating of the heating medium beyond the predetermined upper limit value. In view of the fact that the present-day development of heat technology, particularly that relating to the central heating of dwellings, is oriented towards pressurized, closed-circuit systems with relatively small boiler volume, temperature sensors of the type disposed in a protective sleeve are generally no longer adapted for the regulation of heating medium temperature.

SUMMARY OF THE INVENTION

It is an object of the invention to provide a device for securing to a vessel wall a temperature sensor which is directly contacted by the heating medium in the vessel and which may be removed from the vessel wall without the necessity of depressurizing and/or draining the heating medium.

This object and others to become apparent as the specification progresses, are accomplished by the invention, according to which, briefly stated, a temperature sensor is positioned in an opening of a vessel wall by a holding mechanism which contains a sealing means that cooperates with the temperature sensor to close off the opening in a fluid tight manner. To that end of the temperature sensor which is inside the vessel, there is releasably attached a plug member which is drawn by the temperature sensor into operative engagement with the sealing means as the temperature sensor is withdrawn therefrom. Thereafter, the temperature sensor is disconnected from the plug member and the latter is left in an operative engagement with the sealing means, while the temperature sensor is removed from the vessel, for example, for replacement.

DESCRIPTION OF THE PREFERRED EMBODIMENTS

Figure 1:
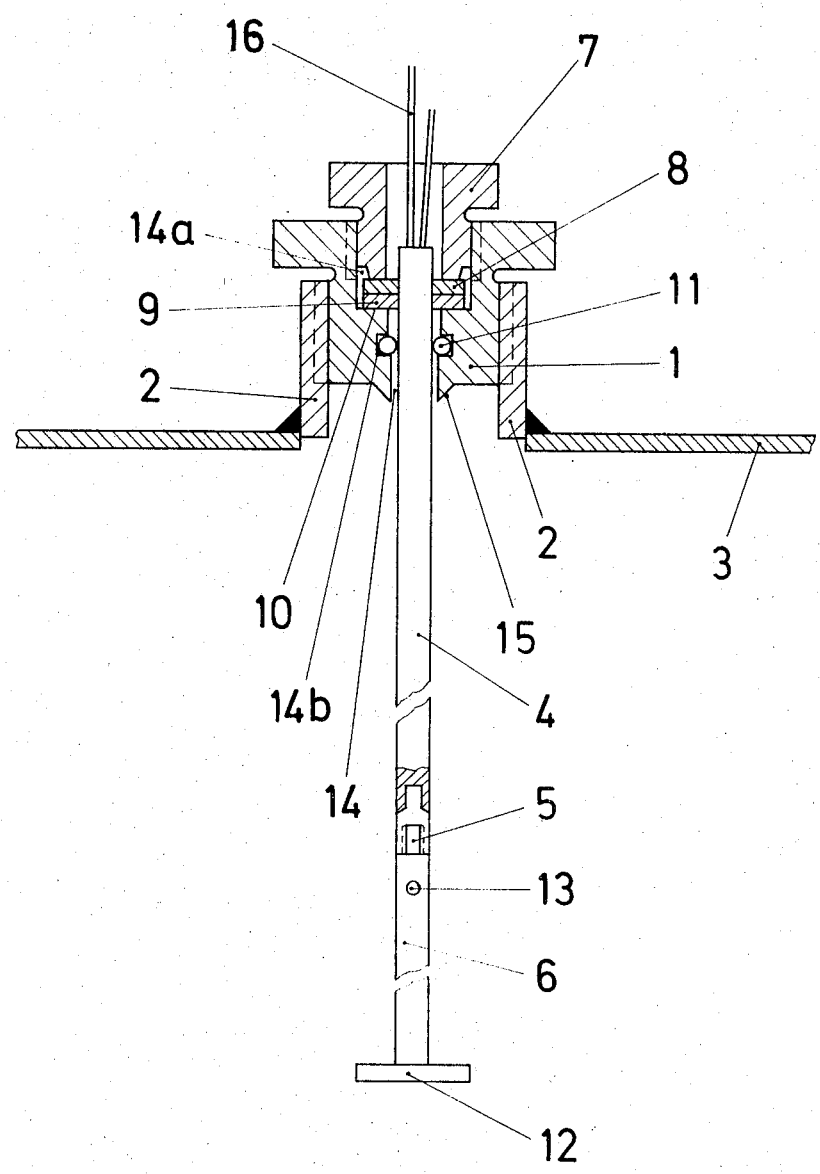
FIG. 1 is an axial sectional view of a preferred embodiment of the invention.

Turning now to FIG. 1, the embodiment shown therein comprises a bushing 1 which has an external thread engaging an internal thread of a nipple 2. The latter is inserted in an opening of the wall 3 of a boiler or other vessel containing the heating medium and is welded to the vessel wall. A temperature sensor 4 extends through a throughgoing passage 14 of the bushing 1 and projects into the vessel. The temperature sensor 4 is secured to the bushing 1 in a fluid tight, releasable manner. This is accomplished by an axially hollow tightening member 7 which, with external threads engages internal threads provided in the cylindrical wall of an enlarged portion 14a of the passage 14 in the bushing 1 and presses, when tightened, an annular washer 8 and an annular packing ring 9 — both surrounding the outer face of the temperature sensor 4 — against an inner annular shoulder 10 formed by the base of the enlarged portion 14a of the passage 14. A radial sealing between the temperature sensor 4 and the bushing 1 is ensured by an O-ring 11 disposed in a circumferential groove 14b provided in the bushing 1 and communicating with the passage 14. the sealing function of the O-ring 11, as it will become apparent hereinafter, is particularly significant upon removal of the temperature sensor 4 from the vessel wall 3.

To that end of the temperature sensor 4 which in normal operation, is situated within the vessel, there is secured a plug member 6 by means of a threaded engagement 5. To that end of the plug 6 which is remote from the temperature sensor 4, there is affixed a transversely extending stop 12. The plug 6 is further provided with a radial bore hole or passage 13. It is noted that the cross-sectional outline of the temperature sensor 4 and the plug 6 have substantially the same dimensions; in the embodiment illustrated in FIG. 1, both components 4 and 6 have cylindrical configurations of identical diameter.

If now the temperature sensor 4 is to be removed from the vessel wall 3, for example, for repair, replacement or exchange, first the tightening member 7 is loosened to remove the clamping effect of the washer 8 and the packing ring 9 from the temperature sensor 4. It is noted that the loosening of the member 7 does not affect the radial sealing action of the O-ring 11.

Thereafter the temperature sensor 4 and the plug 6 are pulled outwardly as a unit through the bushing 1. An abutment of the stop 12 against the bushing 1 prevents further outward movement of the assembly 4, 6. At this time the relative position between the assembly comprising the bushing 1 and the O-ring 11 and the assembly comprising the temperature sensor 4 and the plug 6 is characterized as follows: first, the temperature sensor 4 is in its entirety situated externally of the bushing 1; second, the O-ring 11 now surrounds sealingly the plug 6, rather than the temperature sensor 4; and third, the radial bore hole 13 of the plug 6 is situated externally of the bushing 1 and is thus accessible from the outside.

As the next step, a retaining pin (not shown) is inserted into the radial bore hole 13.

Then, with the aid of the retaining pin held transversely in the plug 6, the temperature sensor 4 is disconnected from the plug 6 by unscrewing. During this unscrewing operation the temperature sensor 4 is held stationary and the plug member 6 is rotated since connections usually extending from the temperature sensor to the switching devices prohibit a turning motion of the temperature sensor. The sealing effect between the O-ring 11 and the plug 6 is not weakened even in case of relative rotation between these two components, and thus the vessel is maintained securely fluid tight with the aid of the plug 6 in the absence of the temperature sensor 4.

The primary function of the retaining pin passing through the bore hole 13, however, is to prevent the plug 6 from being accidentally pushed into the vessel and thus causing a separation of the plug 6 from the bushing 1. It will be thus apparent that for this purpose the dimensions of the retaining pin have to be so designed that, when held in the plug 6, it cannot pass through the bushing 1. It is noted that the aforementioned loss of the plug 6 would not only be inconvenient, but also dangerous, since, according to the invention, the heating medium in the vessel is not depressurized or drained. Consequently, the heating medium would escape through the passage 14 of the bushing 1 under substantial pressure and temperature as soon as the sealing effected by the cooperation of the O-ring 11 and the plug 6 is removed.

A re-insertion of a repaired, replaced or exchanged temperature sensor 4 into the vessel wall 3 is effected in a reverse order. Thus, first the temperature sensor 4 and plug 6 are screwed together by, for example, rotating the plug 6. Subsequently, the retaining pin is removed from the bore 13 and then the temperature sensor 4 and the plug 6 are, as a unit, pushed inside the vessel, the packing ring 9 and the sealing washer 8 are re-inserted and tightened by screwing down the tightening member 7. Thereafter the temperature sensor is ready for operation.

In the embodiment illustrated in FIG. 1, at that terminus of the passage 14 of the bushing 1 which is oriented towards the inside of the vessel, there is arranged an annular, knife-like scraper 15 which, as the temperature sensor 4 and the plug 6 are pulled out as a unit, removed deposits which may have formed thereon. The use of the scraper 15 is particularly significant in case water is used as the heating medium, since then calcite deposits on the temperature sensor may in all likelihood appear.

The temperature sensor 4 may be of the type that — similarly to a liquid thermometer — comprises a vessel for an expansible liquid which undergoes temperature-dependent volume variations sensed, through a capillary 16, by a detecting and switching device known by itself. It is to be understood, however, that the invention is not limited to any particular type of temperature sensor.

Figure 2:
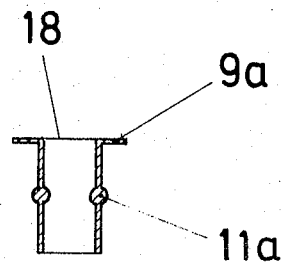
FIGS. 2 and 3 are axial sectional views of modifications of a sealing arrangement present in the preferred embodiment

Turning now to FIG. 2, there is shown a sealing sleeve 18 which in a one-piece structure combines the function of the packing gasket 9 and the O-ring 11. For this purpose, the sleeve 18, which may be made of any known sealing material, is provided with a radially outwardly extending annular flange 9a (performing the function of the gasket 9) and a circumferential rib (performing the function of the O-ring 11). The rib 11a, when viewed in cross section (as observable from FIG.

2), protrudes from the sleeve wall both radially inwardly and radially outwardly. The sleeve 18 may be inserted into the bushing 1 instead of the separate components 9 and 11.

Figure 3:
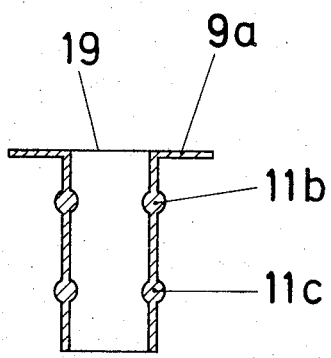

The sealing sleeve 19 illustrated in FIG. 3 differs from the sealing sleeve 18 shown in FIG. 2 only in that it has two spaced peripheral ribs 11b and 11c corresponding to two adjacent, axially aligned O-rings 11.

Figure 4:
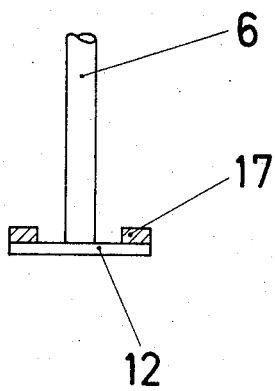
FIG. 4 is a fragmentary axial view, partially in section, of a modification of a component forming part of the preferred embodiment.

In FIG. 4 there is illustrated the lower end portion of the plug 6 and the stop 12. That annular face of the stop 12 which is oriented towards the bushing 1, carries a sealing ring 17 which, when the stop 12 is in engagement with the underside of the bushing 1, aids the sealing function of the device, particularly when the heating medium in the vessel is under pressure. The sealing ring 17 is, particularly when the heating medium is water, made of a porous sealing material so that the compressibility of the sealing ring 17, when in engagement with the bushing 1, ensures its sealing function even if calcite deposits are present on the surface of the sealing ring 17. The use of a sealing ring 17 on the stop 12 is particularly advantageous in the presence of the scraper 15 which tends to prevent a face-to-face engagement between the stop flange 12 and the underside of the bushing 1.

By virtue of the invention it is thus accomplished that a temperature sensor may be arranged in a vessel wall for direct contacting by the medium in the vessel (to thus ensure a rapid temperature transmission from the medium to the temperature sensor) without the heretofore present necessity of depressurizing and/or draining the medium when the temperature sensor is to be removed from the vessel wall.

It will be understood that the above description of the present invention is susceptible to various modifications, changes and adaptations, and the same are intended to be comprehended within the meaning and range of equivalents of the appended claims.

We claim:

1. A device for securing a temperature sensor to a vessel wall, wherein the temperature sensor projects through an opening in the wall into the vessel to be surrounded and directly contacted by a medium contained in the vessel, comprising in combination:
   a. holding means supported by said vessel wall for positioning and carrying said temperature sensor in an operative position thereof;
   b. sealing means disposed in said holding means for surrounding and engaging said temperature sensor in the operative position of the latter to provide a fluid tight seal between the inside and the outside of said vessel, said temperature sensor and said sealing means being arranged for a removal of said temperature sensor from its said operative position by sliding through and out of said sealing means;
   c. a plug member secured to and carried by said temperature sensor, said plug member being in an inoperative position within said vessel spaced from said sealing means as long as said temperature sensor is in its operative position, said plug member being arranged for movement into an operative position by said temperature sensor upon withdrawal of the latter from said sealing means, at least one part of said sealing means surrounding and engaging said plug member in the operative position of the latter to provide a fluid tight seal between the inside and the outside of said vessel; and
   d. disconnectable means for releasably securing said temperature sensor to said plug member, whereby said temperature sensor is separable from said plug member for entirely disconnecting said temperature sensor from said vessel while leaving said plug member in its operative position.

2. A device as defined in claim 1, wherein said disconnectable means includes complemental threads on said temperature sensor and said plug member.

3. A device as defined in claim 1, wherein said plug member includes means for preventing a separation of said plug member from said holding means when said plug member is in its operative position and is disconnected from said temperature sensor.

4. A device as defined in claim 1, wherein said plug member includes means defining a passage passing transversely through said plug member and disposed outside said vessel and said holding means when said plug member is in its operative position, for receiving a retaining pin adapted to cooperate with said holding means for preventing said plug member from being accidentally separated from said holding means.

5. A device as defined in claim 1, wherein said sealing means includes at least one O-ring disposed in said holding means and arranged for a radial sealing of said temperature sensor and said plug member in their respective operative positions.

6. A device as defined in claim 1, wherein said holding means and said sealing means include a bushing secured to said vessel wall and having an axis passing through said opening in the vessel wall; means in said bushing defining a throughgoing passage communicating with the inside of said vessel; an annular shoulder formed within said bushing and surrounding said passage; a packing gasket supported by said shoulder; and a tightening member received in said passage for pressing said packing gasket against said shoulder.

7. A device as defined in claim 6, including a washer positioned between said packing gasket and said tightening member.

8. A device as defined in claim 6, wherein said passage has an enlarged end portion oriented away from the inside of the vessel, said enlarged end portion having a base constituting said annular shoulder; said tightening member is received in said enlarged end portion.

9. A device as defined in claim 6, including means for threadedly securing said tightening member to said bushing.

10. A device as defined in claim 6, wherein said sealing means further includes at least one sealing ring disposed in said bushing spaced from and substantially in axial alignment with said packing gasket, said sealing ring is arranged for a radial sealing of said temperature sensor and said plug member in their respective operative positions.

11. A device as defined in claim 10, wherein said sealing means includes a one-piece element incorporating said packing gasket and said sealing ring.

12. A device as defined in claim 11, wherein said one-piece element is a sleeve member disposed in said passage, said sleeve having an integral, annular, radially outwardly extending flange portion constituting said packing gasket, said sleeve further having at least one integral, radially protruding, circumferential rib constituting said at least one sealing ring.

13. A device as defined in claim 6, further comprising a cylindrical nipple defining said opening and affixed to said vessel wall; and complemental thread means for releasably securing said bushing to said nipple.

14. A device as defined in claim 1, further comprising a stop member situated within said vessel and affixed to said plug member, said stop member cooperating with said holding means when said plug member is in its operative position for preventing outward removal of said plug member from said holding means.

15. A device as defined in claim 14, wherein said stop member has a face oriented towards said holding means, further comprising a seal member affixed to said face for cooperating with said holding means when said plug member is in its operative position.

16. A device as defined in claim 1, further including scraper means affixed to said holding means, said scraper means is arranged for cooperation with said temperature sensor and said plug member to remove deposits therefrom.

17. A device as defined in claim 16, wherein said scraper means has the configuration of an annular member terminating in an annular knife edge.

18. A device as defined in claim 1, wherein said temperature sensor and said plug member have identical cross-sectional dimensions, said dimensions are constant along the length of said temperature sensor and said plug member.

19. A device as defined in claim 18, wherein said temperature sensor and said plug member each has the shape of a cylinder.

* * * * *